US008533174B2

(12) United States Patent
Jung et al.

(10) Patent No.: US 8,533,174 B2
(45) Date of Patent: Sep. 10, 2013

(54) MULTI-ENTITY-CENTRIC INTEGRATED SEARCH SYSTEM AND METHOD

(75) Inventors: Han Min Jung, Daejeon-si (KR); Mi Kyung Lee, Gyeongsan-si (KR); Pyung Kim, Daejeon-si (KR); Seung Woo Lee, Daejeon-si (KR); Du Seok Jin, Daejeon-si (KR); Jung Sun Yoon, Daejeon-si (KR); Dong In Park, Seoul (KR); Won Kyung Sung, Daejeon-si (KR); Sun Hwa Hahn, Daejeon-si (KR)

(73) Assignee: Korea Institute of Science and technology Information, Daejeon (KR)

( * ) Notice: Subject to any disclaimer, the term of this patent is extended or adjusted under 35 U.S.C. 154(b) by 447 days.

(21) Appl. No.: 12/174,730

(22) Filed: Jul. 17, 2008

(65) Prior Publication Data

US 2009/0254527 A1 Oct. 8, 2009

(30) Foreign Application Priority Data

Apr. 8, 2008 (KR) .................. 10-2008-0032741

(51) Int. Cl.
*G06F 7/00* (2006.01)
*G06F 17/30* (2006.01)
(52) U.S. Cl.
USPC ........................................ 707/708; 707/714
(58) Field of Classification Search
None
See application file for complete search history.

(56) References Cited

U.S. PATENT DOCUMENTS

| | | | |
|---|---|---|---|
| 5,873,080 A * | 2/1999 | Coden et al. ................ | 1/1 |
| 6,038,351 A * | 3/2000 | Rigakos .................. | 382/305 |
| 6,301,584 B1 * | 10/2001 | Ranger ................... | 1/1 |
| 6,460,025 B1 * | 10/2002 | Fohn et al. ................ | 706/45 |
| 6,778,979 B2 * | 8/2004 | Grefenstette et al. ........... | 1/1 |
| 7,200,820 B1 * | 4/2007 | Stephens .................. | 715/838 |
| 7,783,658 B1 * | 8/2010 | Bayliss ................... | 707/765 |
| 8,321,434 B1 * | 11/2012 | Ren et al. ................ | 707/755 |
| 8,375,017 B1 * | 2/2013 | Perkins et al. ............. | 707/706 |
| 8,417,713 B1 * | 4/2013 | Blair-Goldensohn et al. .............. | 707/751 |

(Continued)

FOREIGN PATENT DOCUMENTS

| | | |
|---|---|---|
| JP | 2002-522847 A | 7/2002 |
| JP | 2003-132060 A | 5/2003 |
| WO | WO 2005065166 A2 * | 7/2005 |
| WO | WO 2007124385 A2 * | 11/2007 |

OTHER PUBLICATIONS

Determining semantic similarity among entity classes from different ontologies, Rodriguez et al, IEEE transactions on knowledge and data engineering, 15(2), pp. 442-456, 2003.*

(Continued)

*Primary Examiner* — Augustine K Obisesan
(74) *Attorney, Agent, or Firm* — LRK Patent Law Firm

(57) ABSTRACT

Disclosed herein is a multi-entity-centric integrated search system and method. The multi-entity-centric integrated search system includes an entity information acquisition server for receiving and analyzing a query term and determining entities and types of entities, and an integrated search result provision server for configuring an integrated search results page using results acquired from unit service calling units, such as an external API calling unit, a search engine calling unit, and an inference engine calling unit, and presenting integrated search results. The present invention is advantageous in that precise search results can be shown more rapidly, satisfaction with search results for a query term in which multiple entities coexist can be improved, the ambiguity of query terms is overcome, and an open platform capable of operating in conjunction with various types of web services is provided.

39 Claims, 6 Drawing Sheets

(56) References Cited

U.S. PATENT DOCUMENTS

| | | | |
|---|---|---|---|
| 2002/0152199 A1* | 10/2002 | Teng et al. | 707/3 |
| 2003/0069877 A1* | 4/2003 | Grefenstette et al. | 707/2 |
| 2003/0078911 A1* | 4/2003 | Haskell et al. | 707/2 |
| 2004/0003347 A1* | 1/2004 | Saidenberg et al. | 715/511 |
| 2004/0006460 A1* | 1/2004 | Katayama et al. | 704/10 |
| 2004/0030690 A1* | 2/2004 | Teng et al. | 707/3 |
| 2004/0133561 A1* | 7/2004 | Burke | 707/3 |
| 2005/0108200 A1* | 5/2005 | Meik et al. | 707/3 |
| 2005/0108262 A1* | 5/2005 | Fawcett et al. | 707/100 |
| 2005/0278308 A1* | 12/2005 | Barstow | 707/3 |
| 2005/0278309 A1* | 12/2005 | Evans et al. | 707/3 |
| 2006/0122986 A1* | 6/2006 | Sohma | 707/3 |
| 2006/0143674 A1* | 6/2006 | Jones et al. | 725/113 |
| 2007/0011140 A1* | 1/2007 | King et al. | 707/3 |
| 2007/0078873 A1* | 4/2007 | Avinash et al. | 707/101 |
| 2007/0192300 A1* | 8/2007 | Reuther et al. | 707/3 |
| 2008/0215565 A1* | 9/2008 | Sun et al. | 707/5 |
| 2008/0306908 A1* | 12/2008 | Agrawal et al. | 707/3 |
| 2008/0319945 A1* | 12/2008 | Heyraud et al. | 707/3 |
| 2009/0150378 A1* | 6/2009 | Skubacz et al. | 707/5 |
| 2009/0164431 A1* | 6/2009 | Zivkovic et al. | 707/3 |
| 2009/0327271 A1* | 12/2009 | Amitay et al. | 707/5 |

OTHER PUBLICATIONS

Entity Search Engine: Towards agile best-effort information integration over the web, Cheng et al, CIDR 2007.*

Incremental Visual Queries, Derthick M., ACM Transaction on Information Systems (TOIS), 2004.*

Yusuke Kiritani et al., "Generalization Structure Analysis of Query Terms Based on a Knowledge Base and its Application to Entity Retrieval", 19th Data Engineering Workshop, Apr. 7, 2008, pp. 1-8, Japan.

Ding Choon Hoong et al., "Guided Google: A Meta Search Engine and its Implementation using the Google Distributed Web Services", GRIDS Laboratory Department of Computer Science and Software Engineering, Mar. 12, 2003, pp. 1-8, Australia.

JPO Office Action for Japanese Patent Application No. 2011-503894 which corresponds to U.S. Appl. No. 12/174,730.

European Search Report for European Patent Application No. 08753139.8 which corresponds to U.S. Appl. No. 12/174,730.

* cited by examiner

MULTI-ENTITY-CENTRIC INTEGRATED SEARCH SYSTEM AND METHOD

BACKGROUND OF THE INVENTION

1. Field of the Invention

The present invention relates, in general, to an integrated search system and method on a network, and, more particularly, to a system and method for providing the optimal results of an entity-centric integrated search for a query term entered by a user.

2. Description of the Related Art

An entity is an object or a concept that may belong to a specific group, such as a topic group, a person group or an organization group. For example, entities belonging to a person group may include "Lee Sunshin", "Bill Gates", etc., and entities belonging to a topic group may include "information search," "semantic web", etc. Meanwhile, an entity type is a specific group to which entities belong, and denotes topic, a person, an organization, etc.

Recently, some portal sites, including Naver, have provided a service for additionally showing entity-related information in an upper portion of a search results page when a user enters the name of a specific person or organization as a query term. For example, when the user enters "Bill Gates" in Naver, personal information about "Bill Gates" is displayed in the upper portion of the search results page. However, this means that personal information, which has been manually configured, is merely displayed, but an identifier scheme is not utilized. Further, when a person of the same name exists, there is a limitation in overcoming the ambiguity of the search. Furthermore, there is a problem in that, when a query term in which multiple entities coexist is input, complete entity-related information is not shown.

Consequently, the conventional service incompletely shows information corresponding to multiple entities in which a user is interested, thus not only decreasing satisfaction with search results, but also resulting in a waste of time by requiring a repeat search.

Therefore, there is a need to provide a precise integrated search service, which enables entities and the types thereof to be automatically recognized on the basis of an identifier scheme, such as a Uniform Resource Identifier (URL) or an International Resource Identifier (IRI), and which enables integrated entity-centric search results to be shown.

SUMMARY OF THE INVENTION

Accordingly, the present invention has been made keeping in mind the above problems occurring in the prior art, and an object of the present invention is to provide a multi-entity-centric integrated search system, which can show precise search results more rapidly.

Another object of the present invention is to provide a multi-entity-centric integrated search system, which can improve satisfaction with search results for a query term, in which multiple entities coexist.

A further object of the present invention is to provide a multi-entity-centric integrated search system, which can overcome the ambiguity of a query term.

Yet another object of the present invention is to provide a multi-entity-centric integrated search system, which provides an open platform capable of operating in conjunction with various types of web services.

Still another object of the present invention is to provide a multi-entity-centric integrated search method, which can show precise search results more rapidly.

Still another object of the present invention is to provide a multi-entity-centric integrated search method, which can improve satisfaction with search results for a query term in which multiple entities coexist.

Still another object of the present invention is to provide a multi-entity-centric integrated search method, which can overcome the ambiguity of a query term.

Still another object of the present invention is to provide a multi-entity-centric integrated search method, which provides an open platform capable of operating in conjunction with various types of web services.

The above and other objects can be achieved by the present invention, which will be described in detail later.

The present invention provides a multi-entity-centric integrated search system, the system being connected through a wired/wireless communication network and performing computer communication and operation processing, comprising an entity information acquisition server including a query term input unit for receiving a query term, a query term analysis unit for analyzing the query term and detecting combinations of entities separated by a delimiter from the query term, an entity search unit for searching an entity database for the detected entities and returning existence of entities and types of the entities as resulting values, an entity and entity type detection unit for providing combinations, all entities of each of which exist in the entity database, among the combinations, as final search results, and an entity and entity type determination unit for selecting any one from among the combinations, all entities of each of which exist in the entity database, and an integrated search result provision server including a search result calling unit for utilizing at least one unit service calling unit, which acquires search result values for the selected combination, a unit service result configuration unit for setting a method of arranging and outputting the search result values, and an integrated search result presentation unit for outputting integrated search results including the arranged search result values.

Further, the present invention provides a multi-entity-centric integrated search method, the method making a connection through a wired/wireless communication network and performing computer communication and operation processing, comprising the steps of receiving a query term through a query term input unit, analyzing the query term and detecting combinations of entities separated by a delimiter through a query term analysis unit, searching an entity database for the detected entities and returning existence of entities and types of entities as resulting values through an entity search unit, providing combinations, all entities of each of which exist in the entity database, among the combinations, as final search results through an entity and entity type detection unit, selecting any one from among the combinations, all entities of each of which exist in the entity database, through an entity and entity type determination unit, utilizing at least one unit service calling unit, which acquires search result values for the selected combination through a search result calling unit, arranging and outputting the search result values through a unit service result configuration unit, and outputting integrated search results, including the arranged search result values, through an integrated search result presentation unit.

DESCRIPTION OF THE PREFERRED EMBODIMENTS

Figure 1:
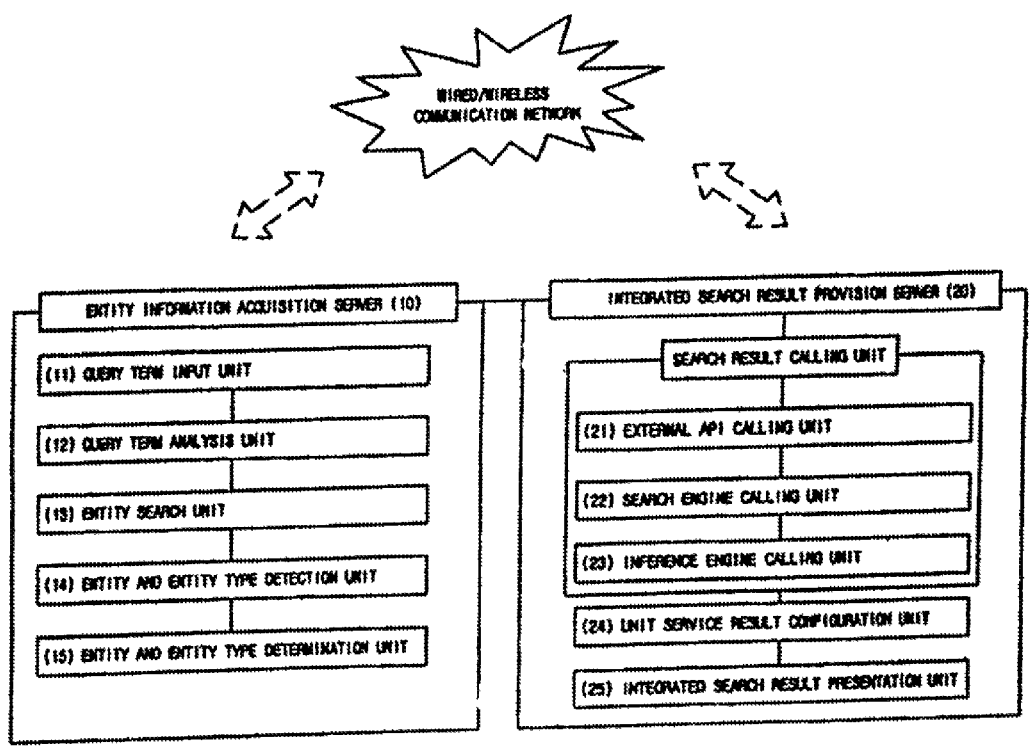
FIG. 1 is a diagram showing the construction of an embodiment of a multi-entity-centric integrated search system according to the present invention.

A wired/wireless communication network connection method and a computer communication and operation processing method are well-known technologies, and can be easily implemented by those skilled in the art. A system according to the present invention is characterized in that it includes a server for acquiring entity information and providing integrated search results after being connected to a wired/wireless communication network.

The server of the present invention, which is a computer, performs communication with a network and performs computer operation processing. Further, the server of the present invention includes components for performing various functions, and respective components are operated by the processor, memory or input/output means of the server. A method in which the components of the server according to the present invention are operated by the processor, memory or input/output means of the server is well-known technology, which can be easily implemented by those skilled in the art.

The system according to the present invention includes an entity information acquisition server 10 for receiving a query term, analyzing the query term, and determining entities and the types of entities, and an integrated search result provision server 20 for configuring an integrated search results page using results acquired from unit service calling units, such as an external Application Programming Interface (API) calling unit, a search engine calling unit, and an inference engine calling unit, and presenting the integrated search results.

The entity information acquisition server 10 according to the present invention includes a query term input unit 11 for receiving a query term, a query term analysis unit 12 for analyzing the query term and detecting combinations of entities separated by a delimiter from the query term, an entity search unit 13 for searching an entity database for the detected entities and returning the existence of entities and the types of entities as resulting values, an entity and entity type detection unit 14 for providing only combinations, all entities of each of which exist in the entity database, among the combinations, as final search results, and an entity and entity type determination unit 15 for selecting any one from among the combinations, all entities of each of which exist in the entity database.

The query term input unit 11 receives a query term from a user through a search box. In this case, the input query term may include at least one of entities stored in the previously constructed entity database, or may not include entities.

The query term analysis unit 12 detects entity candidates by analyzing the query term. Since a query term may be ambiguous, all combinations of keywords, separated by the delimiter, such as a space, a semicolon, a colon or a tab, are generated in consideration of the sequence of the keywords. Here, the delimiter may be used in the form of a combination of the examples, and is not particularly limited to the above examples. For example, 'Web Ontology Language' may be the query term 'Web'+'Ontology'+'Language', or 'Web Ontology Language'. Ultimately, a total of 4 combinations, that is, the combination 'Web'+'Ontology'+'Language', the combination 'Web'+'Ontology Language', the combination 'Web Ontology'+'Language', and the combination 'Web Ontology Language', are generated for the query term 'Web Ontology Language'.

The entity search unit 13 searches the entity database for entities constituting the combinations, generated by the query term analysis unit 12, and acquires information about whether the entities exist in the entity DB and the types of entities, as resulting values. The entity DB stores various entities and corresponding entity types in advance. For example, when 'Web' is stored in the entity DB, topic, which is the entity type of 'Web', together with a success message indicating that the entity 'Web' exists, are returned as resulting values. When all search results for respective combinations are acquired, this operation is completed.

Figure 2:
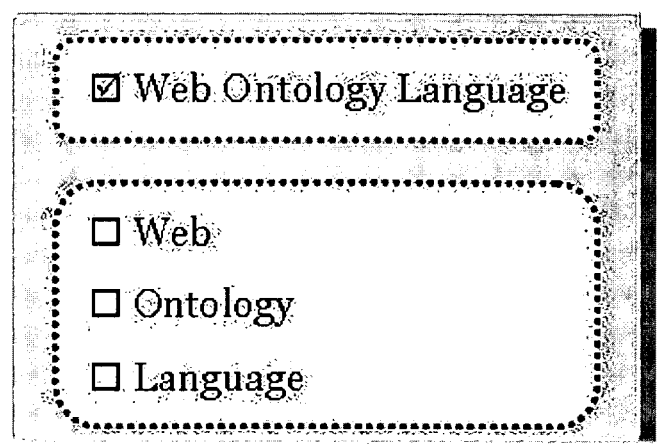
FIG. 2 is a diagram showing an example of a resulting page in which the ambiguity of a query term is processed according to the present invention.

The entity and entity type detection unit 14 provides entities, entity identifiers, and entity types as final entity search results only when all of the entities included in each combination exist in the entity database. For example, when, of the four combinations, 'Ontology Language' and 'Web Ontology' are not stored in the entity database, and a partial search failure occurs for the second combination 'Web'+'Ontology Language' and the third combination 'Web Ontology'+'Language', only the first combination 'Web'+Ontology'+'Language' and the fourth combination 'Web Ontology Language,' but not the second and third combinations, are provided as the final entity search results (refer to FIG. 2).

Figure 3:
FIG. 3 is a diagram showing an example of a resulting page in which the ambiguity of an entity is processed according to the present invention.
Figure 4:
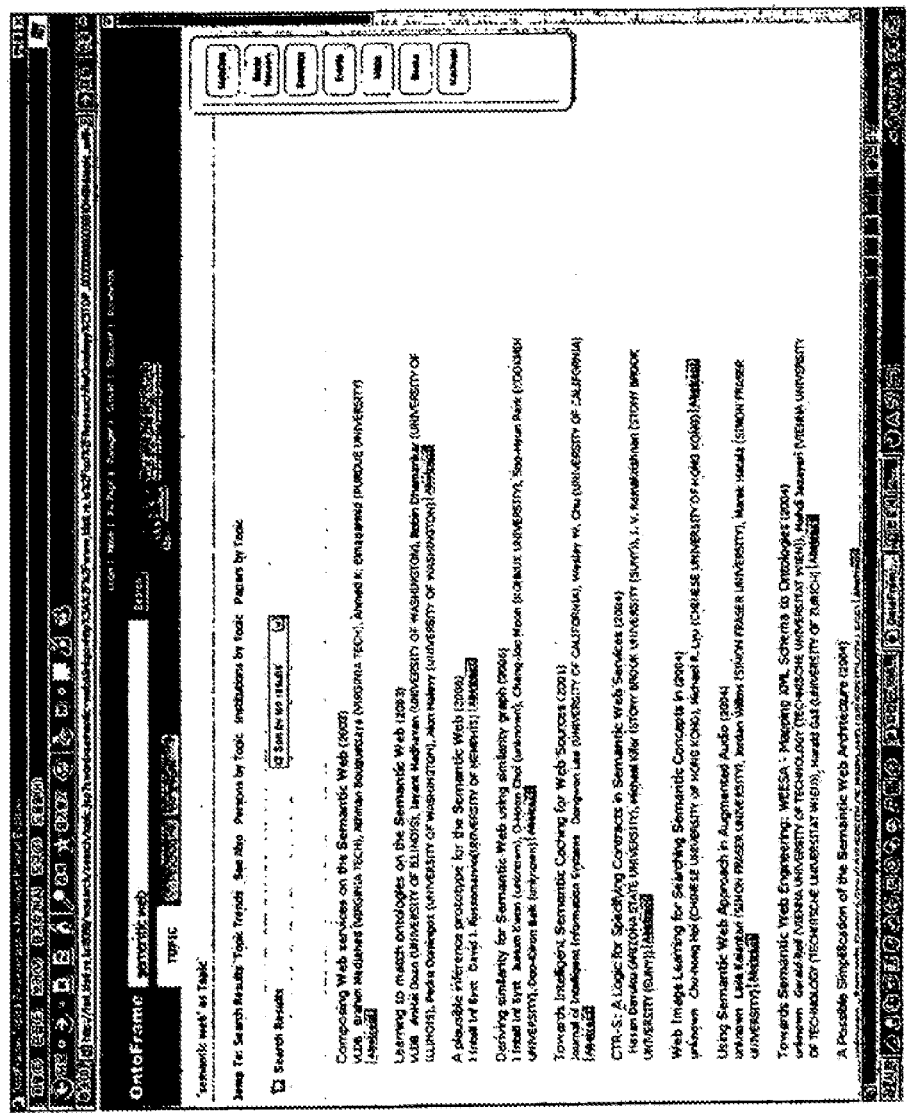
FIG. 4 is a diagram showing an example of a page in which one of search results obtained using the search system and method is displayed according to the present invention.
Figure 5:
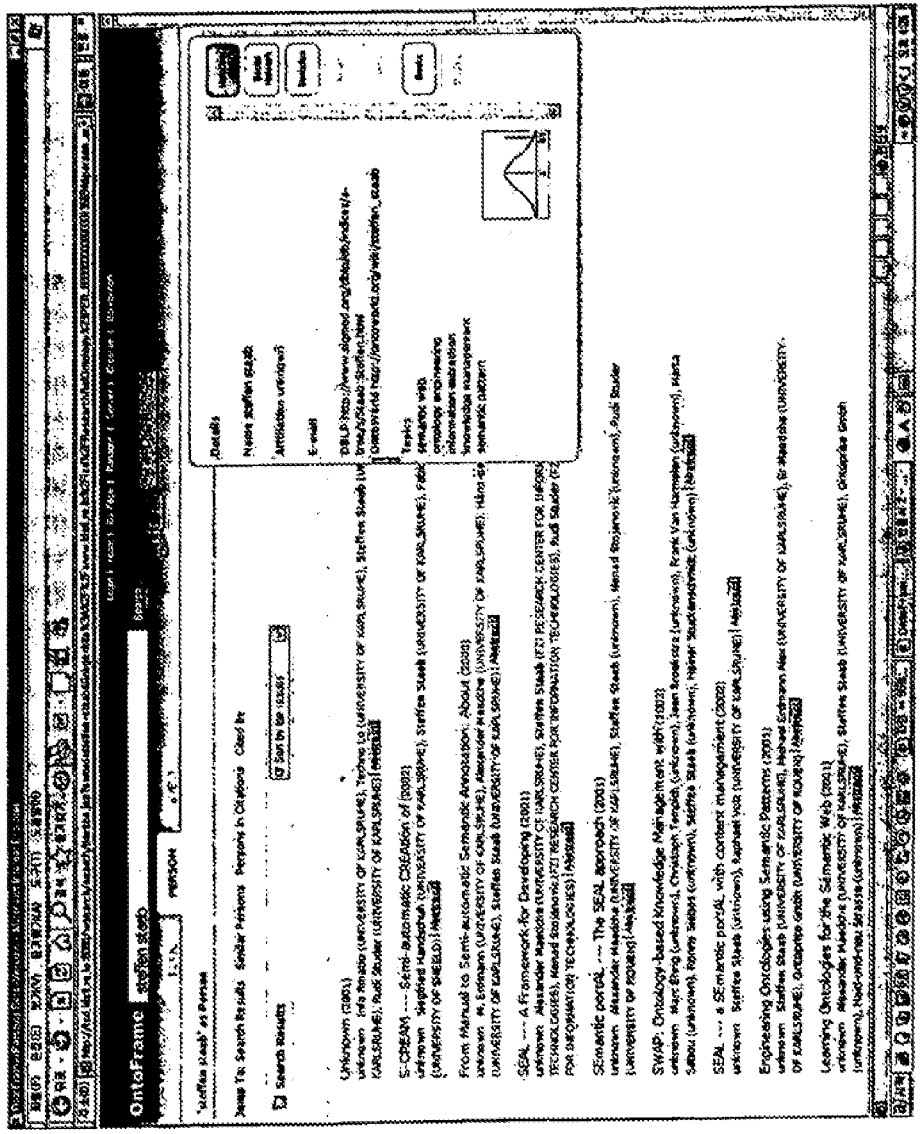
FIG. 5 is a diagram showing an example of a page in which one of search results obtained using the search system and method is displayed according to the present invention.
Figure 6:
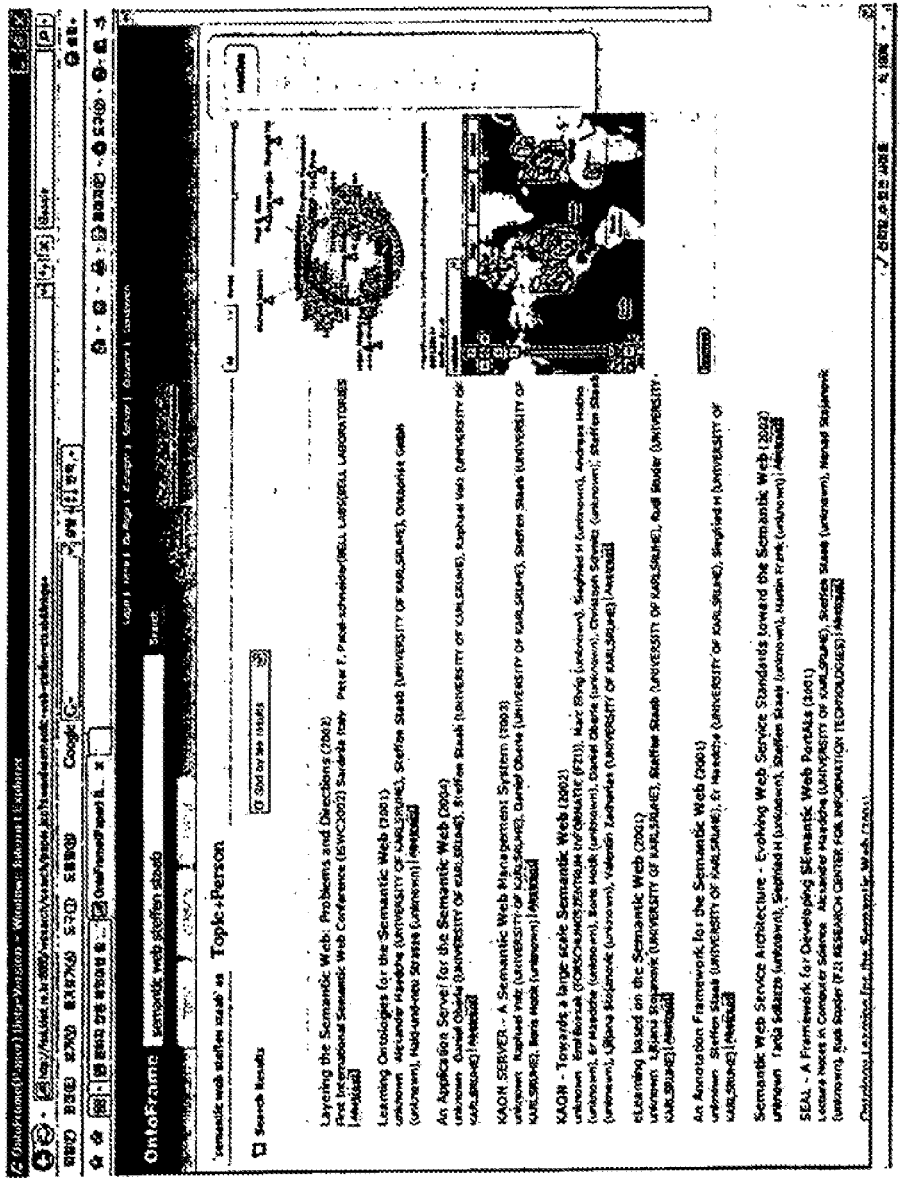
FIG. 6 is a diagram showing an example of a page in which one of search results obtained using the search system and method is displayed according to the present invention.
Figure 7:
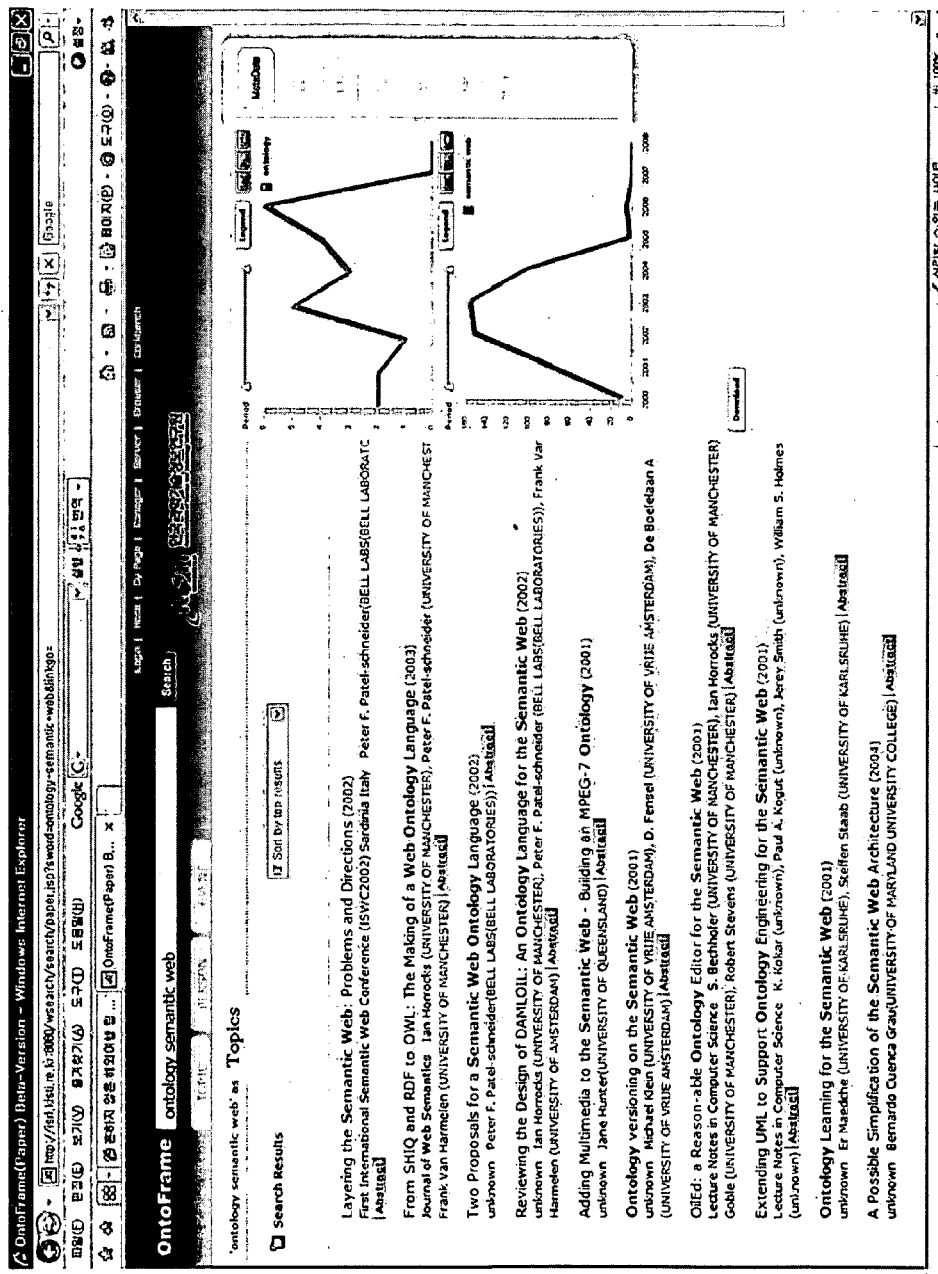
FIG. 7 is a diagram showing an example of a page in which one of search results obtained using the search system and method is displayed according to the present invention.

The entity and entity type determination unit 15 assigns priority for ambiguous query terms by selecting an optimal entity combination to be primarily presented to the user, among successful combinations. There are four methods of determining an optimal entity combination. First, there is a minimum entity number priority method of assigning priority to an entity combination having a smaller number of entities among the combinations. When this method is used, the fourth entity combination 'Web Ontology Language' is selected (refer to FIG. 2). Second, there is a maximum entity number priority method of assigning priority to an entity combination having a larger number of entities among the combinations. When this method is used, the first entity combination 'Web'+'Ontology'+'Language' is selected. Third, there is a minimum entity type number priority method of assigning priority to an entity combination having a smaller number of entity types among the combinations. For example, when an entity type combination composed of topic+person and an entity type combination composed of topic+topic exist, the entity type combination of topic+topic, having a smaller number of entity types, is selected if this method is used. Fourth, there is a maximum entity type number priority method of assigning priority to an entity combination having a larger number of entity types among the combinations. For example, when an entity type combination composed of topic+person, and an entity type combination composed of topic+topic exist, the entity type combination of topic+person, having a larger number of entity types, is selected if this method is used. In conformity with the policy of the entity-centric integrated search service, one of the above methods is selected and used. In some cases, an entity itself may be ambiguous. Different people with the same name are an example of such a case. When there are different people all having the name 'Christian Becker' and having two different identifiers in an identifier scheme, an optimal entity is selected in an arbitrary sequence or in the sequence of identifiers (IDs) (refer to FIG. 3).

The integrated search result provision server 20 according to the present invention includes a search result calling unit for utilizing unit service calling units, which acquire search result values for the selected combination, a unit service result configuration unit 24 for setting a method of arranging and outputting the search result values, and an integrated search result presentation unit 25 for outputting integrated search results including the arranged search result values.

The unit service calling units denote independently executable program calling units, such as an external API calling unit, a search engine calling unit, an inference engine calling unit, a Knowledge Management System (KMS) calling unit, and a Customer Relationship Management (CRM) system calling unit, but they are not limited to these examples. Further, the unit service calling units obtain search result values for the selected combination.

The search result calling unit may selectively use one or more unit service calling units. Further, the search result calling unit may use the same unit service calling unit one or more times. Each of the unit service calling units calls APIs included in corresponding unit services. For example, the search engine calling unit may call various APIs, such as an API for calling a specific person entity, an API for providing search results, and an API for showing related topic, as needed. Further, when the selected combination is 'topic+topic', the external API calling unit may call a Naver book search open API, and a Google Maps open API, the search engine calling unit may call four APIs, and the inference engine calling unit may call three APIs.

Further, the search result calling unit can use only the unit service calling units, such as the external API calling unit, the search engine calling unit, and the inference engine calling unit, which are mapped to the combination selected by the entity and entity type determination unit. That is, when the optimal entity combination is selected, the search result calling unit can check predefined unit service calling units that can be used by that combination, and can run the external API calling unit 21, the search engine calling unit 22, the inference engine calling unit 23, etc. provided in the integrated search result provision server 20. For example, if only the search engine calling unit 22 and the inference engine calling unit 23 are designated to be run when an entity combination is topic+topic, the API calling unit 21 is not run.

The external API calling unit 21 calls the API of an external site or an open API for respective entities included in the optimal entity combination selected by the entity and entity type determination unit 15, thus acquiring corresponding search results. The API of the external site or open API is well-known technology. For example, when 'Web'+'Ontology'+'Language' is selected as an optimal entity combination, the API of the external site or open API is called for respective entities, that is, 'Web', 'Ontology', and 'Language'. At this time, it is efficient to predefine the APIs so that the APIs can be called depending on the type of entity. For example, in the case of Naver Book Search API, calling is permitted only for entities corresponding to topic and person entity types, and in the case of Google Maps API, calling is permitted only for entities corresponding to place and organization entity types.

The search engine calling unit 22 queries a database (for example, a thesis index DB, a patent index DB, etc.), which has been previously indexed in the integrated search system, about respective entities, included in the selected optimal entity combination, and entity URIs or IRIs, thus acquiring corresponding search results. The index DB itself is well-known technology. Respective entities may be queried individually or collectively depending on the index DB. For example, when topic and person entities are included in the optimal entity combination, and a thesis index DB is a search target, a topic entity is searched for in the thesis title field of the thesis index DB, and a person entity is searched for in the thesis author field thereof. In this case, when the index DB includes identifier scheme information, such as a URI, a search is performed with an entity identifier included in a search query. For example, when a person named 'Christian Becker' has a URI, and both an author name and an author URI are included in the author field of the thesis index DB, a search is performed, with the author name and author URI included in a search query.

The inference engine calling unit 23 configures an inference query term using respective entities and entity URIs included in the selected optimal entity combination, thus acquiring corresponding search results from an inference engine. The inference query term is configured using a format such as SPARQL or RDF Data Query Language (RDQL). Generally, in the case of an inference engine, an inference DB is configured to include a URI, which is an identifier scheme, and thus both an entity keyword and an entity URI must be used. The inference engine and the inference DB are well-known technologies.

The unit service result configuration unit 24 configures an integrated search results page using results acquired from the external API calling unit 21, the search engine calling unit 22, and the inference engine calling unit 23. That is, it means that a method of arranging and outputting the search results, acquired from respective calling units, is defined so that they are displayed in a single page. For example, when 5 unit service APIs are called, the arrangement sequence thereof is set, and a unit service API, the search results of which are to be set as default values, among the unit service APIs, is defined. The arrangement and output method is not limited to this example, and may vary in consideration of entity combinations, the properties of respective unit service APIs, etc.

The integrated search result presentation unit 25 may provide various types of user convenience information, such as present condition information about system status, information about the selected combination, information about combinations that are not selected, and information about the size of search results, in addition to the results configured by the unit service result configuration unit 24. After the integrated search result presentation unit 25 has been run, the user can view the completed results for the multi-entity-centric integrated search on a web page.

The multi-entity-centric integrated search method according to the present invention, in a method of making a connection through a wired/wireless communication network and performing communication and operation processing, includes the step of receiving a query term through the query term input unit, the step of analyzing the query term and detecting combinations of entities separated by a delimiter from the query term through the query term analysis unit, the step of searching the entity database for the detected entities and returning the existence of entities and the types of entities as resulting values through the entity search unit, the step of providing combinations, all entities of each of which exist in the entity database, among the combinations, as final search results through the entity and entity type detection unit, the step of selecting any one from among the combinations, all entities of each of which exist in the entity database, through the entity and entity type determination unit, the step of utilizing the unit service calling units, which acquire search result values for the selected combination, through the search result calling unit, the step of arranging and outputting the search result values through the unit service result configuration unit, and the step of outputting integrated search results, including the arranged search result values, through the integrated search result presentation unit.

Other methods according to the present invention can be performed on the basis of the description related to the system according to the present invention.

The method according to the present invention can be implemented in the form of computer-readable code in a computer-readable recording medium. The computer-readable recording medium is a recording device in which data readable by a computer system is stored. For example, recording media may include Read-Only Memory (ROM), Random Access Memory (RAM), Cache memory, a hard disc, an optical disc, a floppy disc, magnetic tape, etc. Further, the computer-readable recording medium may be distributed to computer systems connected through a network and computer-readable code may be stored and executed in the computer systems in a distributed manner.

The present invention provides the integrated search system and method using an identifier scheme, which stores information used to identify a specific entity using an identifier scheme, and can check entity types and entities when a query term entered by the user belongs to previously stored entities, so that an entity-centric integrated search page is configured primarily for optimal entities belonging to an entity type combination, thus providing specified search results.

In particular, the present invention can actively cope with the ambiguity of query terms (for example, keyword combinations generated in the parsing of a query term) and the ambiguity of entities (for example, people having the same name), thus allowing the user to select precise information.

Further, the present invention provides an integrated search system as an open platform in such a way that operation in conjunction with external information is possible by calling an external special service (for example, DBLP for personal information, and Google Maps using entity information, and analyzed information is provided by calling a semantic web-based inference engine.

According to the present invention, even if a query term entered by the user includes multiple entities, as well as a single entity (for example, when a query term is 'Ontology Semantic Web', two topic entities, that is, 'Ontology' and 'Semantic Web', are included), the entities are precisely separated and then processed, so that multi-entity-centric integrated search results, superior to simple integrated search results, are presented.

It should be understood that simple modifications and variations of the present invention can be easily implemented by those skilled in the art are included in the scope of the present invention.

The multi-entity-centric integrated search system and method according to the present invention are advantageous in that precise search results can be shown more rapidly, satisfaction with search results for a query term in which multiple entities coexist can be improved, the ambiguity of query terms is overcome, and an open platform capable of operating in conjunction with various types of web services is provided.

What is claimed is:

1. A multi-entity-centric integrated search system, the system being connected through a wired/wireless communication network and performing computer communication and operation processing, comprising:
    an entity information acquisition server including:
        a query term input unit receiving a query term which is composed of keywords input from a user,
        a query term analysis unit analyzing the query term and generating combinations of entities separated by a delimiter from the query term, wherein the combinations of entities are combinations of the keywords of the query term,
        an entity search unit searching an entity database for the generated combinations of entities and returning existence of the combinations of entities and types of the combinations of entities as resulting values,
        an entity and entity type detection unit selecting candidate combinations of entities, all entities of each of which exist in the entity database, among the generated combinations of entities, and
        an entity and entity type determination unit selecting a final combination of entities from among the candidate combinations of entities, all entities of each of which exist in the entity database, in consideration of a number of entities or a number of entities' types in the candidate combinations of entities,
        wherein the entity information acquisition server is configured to provide the final combination of entities, and the final combination of entities is a query for making final search results which is provided for users in an integrated search result provision server, and
    an integrated search result provision server including:
        unit service calling units acquiring search result values for the final combination of entities,
        a search result calling unit utilizing at least one of the unit service calling units which is mapped to the final combination of entities selected by the entity and entity type determination unit in consideration of entities' types in the final combination of entities,
        a unit service result configuration unit setting a method of arranging and outputting the search result values, and
        an integrated search result presentation unit outputting integrated search results including the arranged search result values,
    wherein the multi-entity-centric integrated search system comprises a processor and a memory, and
    wherein the generating of combinations of entities includes generating all combinations of keywords, separated by the delimiter, in consideration of a sequence of keywords.

2. The multi-entity-centric integrated search system according to claim 1, wherein the unit service calling unit is configured to select at least one from among an external Application Programming Interface (API) calling unit for acquiring search result values by calling an external API and by applying the selected final combination of entities to the external API, a search engine calling unit thr acquiring search result values by calling an API included in a search engine and by applying the selected final combination of entities to the API, an inference engine calling unit for acquiring search result values by calling an API included in an inference engine and by applying the selected final combination of entities to the API, and combinations thereof.

3. The multi-entity-centric integrated search system according to claim 2, wherein the external API is an API of an external service site or an open API.

4. The multi-entity-centric integrated search system according to claim 2, wherein the search engine calling unit is configured to acquire the search result values after querying about previously indexed information.

5. The multi-entity-centric integrated search system according to claim 2, wherein the search engine calling unit is configured to query about the entities included in the selected final combination of entities individually or collectively.

6. The multi-entity-centric integrated search system according to claim 2, wherein the search engine calling unit acquires the search result values by additionally using identifier scheme information, including a Uniform Resource Identifier (URI) and an International Resource Identifier (IRI).

7. The multi-entity-centric integrated search system according to claim 2, wherein an inference query term applied to the inference engine includes the entities included in the selected final combination of entities and identifier scheme information, including a URI or an IRI.

8. The multi-entity-centric integrated search system according to claim 2, wherein an inference query term applied to the inference engine uses a format of SPARQL or RDQL.

9. The multi-entity-centric integrated search system according to claim 1, wherein the delimiter is a space, a semicolon, a colon, tab or a combination thereof.

10. The multi-entity-centric integrated search system according to claim 1, wherein the candidate combinations of entities selected through the entity and entity type detection unit further include entities, entity identifiers, or combinations thereof.

11. The multi-entity-centric integrated search system according to claim 1, wherein a method of selecting a final combination of entities through the entity and entity type determination unit is one of a minimum entity number priority method, a maximum entity number priority method, a minimum entity type number priority method and a maximum entity type number priority method.

12. The multi-entity-centric integrated search system according to claim 1, wherein the integrated search results are provided in a single page.

13. The multi-entity-centric integrated search system according to claim 1, wherein the integrated search results further include any one of present condition information about system status, information about the selected combination, information about combinations that are not selected, information about size of search results, and combinations thereof.

14. A multi-entity-centric integrated search method, the method making a connection through a wired/wireless communication network and performing computer communication and operation processing, comprising the steps of:

receiving a query term which is composed of keywords input from a user through a query term input unit;

analyzing the query term and generating combinations of entities separated by a delimiter through a query term analysis unit, wherein the combinations of entities are combinations of the keywords of the query term;

after the generating of combinations of entities, searching an entity database for the generated combinations of entities and returning existence of the combinations of entities and types of the combinations of entities as resulting values through an entity search unit;

selecting candidate combinations of entities, all entities of each of which exist in the entity database, among the generated combinations of entities, through an entity and entity type detection unit;

selecting a final combination of entities from among the candidate combinations of entities, all entities of each of which exist in the entity database, in consideration of a number of entities or a number of entities' types in the candidate combinations of entities through an entity and entity type determination unit, wherein the final combination of entities is a query for making final search results which is provided for users in an integrated search result provision server;

acquiring search result values for the final combination of entities through unit service calling units;

utilizing at least one of the unit service calling units, which is mapped to the final combination of entities selected by the entity and entity type determination unit, in consideration of entities' types in the final combination of entities through a search result calling unit;

arranging and outputting the search result values through a unit service result configuration unit; and outputting integrated search results, including the arranged search result values, through an integrated search result presentation unit, wherein the generating of combinations of entities includes generating all combinations of keywords, separated by the delimiter, in consideration of a sequence of keywords.

15. The multi-entity-centric integrated search method according to claim 14, wherein the unit service calling unit is configured to select at least one from among an external Application Programming Interface (API) calling unit for acquiring search result values by calling an external API and by applying the selected final combination of entities to the external API, a search engine calling unit for acquiring search result values by calling an API included in a search engine and by applying the selected final combination of entities to the API, an inference engine calling unit for acquiring search result values by calling an API included in an inference engine and by applying the selected final combination of entities to the API, and combinations thereof.

16. The multi-entity-centric integrated search method according to claim 15, wherein the external API is an API of an external service site or an open API.

17. The multi-entity-centric integrated search method according to claim 15, wherein the search engine calling unit is configured to acquire the search result values after querying about previously indexed information.

18. The multi-entity-centric integrated search method according to claim 15, wherein the search engine calling unit is configured to query about the entities included in the selected final combination of entities individually or collectively.

19. The multi-entity-centric integrated search method according to claim 15, wherein the search engine calling unit acquires the search result values by additionally using identifier scheme information, including a Uniform Resource Identifier (URI) and an International Resource identifier (IRI).

20. The multi-entity-centric integrated search method according to claim 15, wherein an inference query term applied to the inference engine includes the entities included in the selected final combination of entities and identifier scheme information, including a URI or an IRI.

21. The multi-entity-centric integrated search method according to claim 15, wherein an inference query term applied to the inference engine uses a format of SPARQL or RDQL.

22. The multi-entity-centric integrated search method according to claim 14, wherein the delimiter is a space, a semicolon, a colon, tab or a combination thereof.

23. The multi-entity-centric integrated search method according to claim 14, wherein the candidate combinations of entities selected through the entity and entity type detection unit further include entities, entity identifiers, or combinations thereof.

24. The multi-entity-centric integrated search method according to claim 14, wherein a method of selecting a final combination of entities through the entity and entity type determination unit is one of a minimum entity number priority method, a maximum entity number priority method, a minimum entity type number priority method and a maximum entity type number priority method.

25. The multi-entity-centric integrated search method according to claim 14, wherein the integrated search results are provided in a single page.

26. The multi-entity-centric integrated search method according to claim 14, wherein the integrated search results further include any one of present condition information about system status, information about the selected combination, information about combinations that are not selected, information about size of search results, and combinations thereof.

27. A non-transitory computer-readable recording medium for recording a program for executing a multi-entity-centric integrated search method, the method making a connection through a wired/wireless communication network and performing computer communication and operation processing and comprising the steps of:
  receiving a query term which is composed of keywords input from a user through a query term input unit;
  analyzing the query term and generating combinations of entities separated by a delimiter through a query term analysis unit, wherein the combinations of entities are combinations of the keywords of the query term;
  after the generating of combinations of entities, searching an entity database for the generated combinations of entities and returning existence of the combinations of entities and types of the combinations of entities as resulting values through an entity search unit;
  selecting candidate combinations of entities, all entities of each of which exist in the entity database, among the generated combinations of entities, through an entity and entity type detection unit;
  selecting a final combination of entities from among the candidate combinations of entities, all entities of each of which exist in the entity database, in consideration of a number of entities or a number of entities' types in the candidate combinations of entities through an entity and entity type determination unit, wherein the final combination of entities is a query for making final search results which is provided for users in an integrated search result provision server;
  acquiring search result values for the final combination of entities through unit service calling units;
  utilizing at least one of the unit service calling units, which is mapped to the final combination of entities selected by the entity and entity type determination unit, in consideration of entities' types in the final combination of entities through a search result calling unit;
  arranging and outputting the search result values through a unit service result configuration unit; and
  outputting integrated search results, including the arranged search result values, through an integrated search result presentation unit,
  wherein the generating of combinations of entities includes generating all combinations of keywords, separated by the delimiter, in consideration of a sequence of keywords.

28. The non-transitory computer-readable recording medium according to claim 27, wherein the unit service calling unit is configured to select at least one from among an external Application Programming Interface (API) calling unit for acquiring search result values by calling an external API and by applying the selected final combination of entities to the external API, a search engine calling unit for acquiring search result values by calling an API included in a search engine and by applying the selected final combination of entities to the API, an inference engine calling unit for acquiring search result values by calling an API included in an inference engine and by applying the selected final combination of entities to the API, and combinations thereof.

29. The non-transitory computer-readable recording medium according to claim 28, wherein the external API is an API of an external service site or an open API.

30. The non-transitory computer-readable recording medium according to claim 28, wherein the search engine calling unit is configured to acquire the search result values after querying about previously indexed information.

31. The non-transitory computer-readable recording medium according to claim 28, wherein the search engine calling unit is configured to query about the entities included in the selected final combination of entities individually or collectively.

32. The non-transitory computer-readable recording medium according to claim 28, wherein the search engine calling unit acquires the search result values by additionally using identifier scheme information, including a Uniform Resource Identifier (URI) and an International Resource Identifier (IRI).

33. The non-transitory computer-readable recording medium according to claim 28, wherein an inference query term applied to the inference engine includes the entities included in the selected final combination of entities and identifier scheme information, including a URI or an IRI.

34. The non-transitory computer-readable recording medium according to claim 28, wherein an inference query term applied to the inference engine uses a format of SPARQL or RDQL.

35. The non-transitory computer-readable recording medium according to claim 27, wherein the delimiter is a space, a semicolon, a colon, tab or a combination thereof.

36. The non-transitory computer-readable recording medium according to claim 27, wherein the candidate combinations of entities selected through the entity and entity type detection unit further include entities, entity identifiers, or combinations thereof.

37. The non-transitory computer-readable recording medium according to claim 27, wherein a method of selecting a final combination of entities through the entity and entity type determination unit is one of a minimum entity number priority method, a maximum entity number priority method, a minimum entity type number priority method and a maximum entity type number priority method.

38. The non-transitory computer-readable recording medium according to claim 27, wherein the integrated search results are provided in a single page.

39. The non-transitory computer-readable recording medium according to claim 27, wherein the integrated search results further include any one of present condition information about system status, information about the selected combination, information about combinations that are not selected, information about size of search results, and combinations thereof.

* * * * *